(12) United States Patent
Ravera

(10) Patent No.: US 12,455,024 B2
(45) Date of Patent: Oct. 28, 2025

(54) CONNECTING ELEMENT

(71) Applicant: MICOSYSTEM S.R.L., Lugo (IT)

(72) Inventor: Stefano Ravera, Lugo (IT)

(73) Assignee: MICOSYSTEM S.R.L., Lugo (IT)

( * ) Notice: Subject to any disclaimer, the term of this patent is extended or adjusted under 35 U.S.C. 154(b) by 0 days.

(21) Appl. No.: 18/599,908

(22) Filed: Mar. 8, 2024

(65) Prior Publication Data

US 2024/0301974 A1    Sep. 12, 2024

(30) Foreign Application Priority Data

Mar. 9, 2023  (IT) .......................... 102023000004398

(51) Int. Cl.
*F16L 15/00*            (2006.01)

(52) U.S. Cl.
CPC ................................. *F16L 15/006* (2013.01)

(58) Field of Classification Search
CPC ......... F16L 15/08; F16L 15/006; F16L 15/00; F16L 5/06
USPC .......... 285/149.1, 154.1, 387, 388, 384, 385
See application file for complete search history.

(56) References Cited

U.S. PATENT DOCUMENTS

| | | | | |
|---|---|---|---|---|
| 944,877 | A * | 12/1909 | Koschinski | F16L 19/0206 285/388 |
| 3,376,054 | A * | 4/1968 | Poux | F16L 47/00 285/149.1 |
| 4,007,953 | A * | 2/1977 | Powell | F16L 19/0231 285/388 |
| 4,291,906 | A * | 9/1981 | Donbavand | F16L 19/0231 285/388 |
| 4,634,154 | A * | 1/1987 | Arora | F16L 19/0231 285/387 |
| 4,728,130 | A * | 3/1988 | Corzine | F16L 19/0231 285/387 |
| 5,160,172 | A | 11/1992 | Gariepy | |
| 5,266,050 | A * | 11/1993 | O'Neil | H02G 3/0625 285/154.1 |
| 5,547,229 | A * | 8/1996 | Eidsmore | F16L 19/0231 285/387 |
| 9,490,619 | B2 * | 11/2016 | Smith | H02G 3/088 |
| 2014/0024250 | A1 | 1/2014 | Spencer | |

FOREIGN PATENT DOCUMENTS

CN    216754168 U    6/2022
FR    3129278 A3     5/2023

OTHER PUBLICATIONS

Italian Search Report dated Sep. 20, 2023 from counterpart Italian App No. IT202300004398.
European Search Report dated Jul. 2, 2024 from counterpart European App No. EP24020073.

* cited by examiner

*Primary Examiner* — David Bochna
(74) *Attorney, Agent, or Firm* — SHUTTLEWORTH & INGERSOLL, PLC; Timothy J. Klima

(57) ABSTRACT

A connecting element including a main body wherein it is made at least one housing, delimited by a top edge and by a bottom edge, including at least one main protrusion made along a direction connecting the top edge and the bottom edge of the housing.

13 Claims, 10 Drawing Sheets

CONNECTING ELEMENT

This application claims priority to Italian Patent Application 102023000004398 filed Mar. 9, 2023, the entirety of which is incorporated by reference herein.

BACKGROUND OF THE INVENTION

The present invention refers to a connecting element comprising universal constraint means.

In the threading field, solutions are known that allow to interconnect components of different sizes. As an example, there exist connecting elements, having one or more ends, having a thread on one or more of their ends. The threads on the different ends can be different. These connecting elements may comprise male or female threads, depending on their realization, either external or internal at the end of the element.

Despite numerous standardisation attempts by regulating organs, today several threading standards coexist, including:
- the ISO metric screw thread, commonly used for mechanical purposes, which follows UNI 4535-64;
- the Whitworth thread, alternative to the aforementioned ISO metric screw thread;
- the GAS thread, traditionally used for connecting pipes;
- EDISON and PG threads, usually used for electrical connections and for electrical wire conduits;
- the Lowenherz thread, used for measuring and optical instruments;
- the UST Unified Thread and the BA (British Association) thread, in which the dimensions are expressed in inches;
- the United States Standard thread, also called the SAE thread; and
- the triangular, square and/or trapezoidal thread.

Therefore, the externally threaded ends, or of male type, are usually made according to a specific thread protocol or standard and are characterized by constructive parameters, such as the diameter and the thread pitch, that allow the joining with a corresponding internally threaded end, or of female type, made according to such specific protocol or thread standard and having construction parameters corresponding to those of the male type end.

DISADVANTAGES IN THE PRIOR ART

A problem with the existing connecting elements is that systems made by means of threaded connecting elements, such as mechanical systems or piping systems (hydraulic, electrical, etc.), are subject to numerous enlargements, repair and/or conversion. Therefore, the lack of versatility of the connecting elements emerges: once the standard and construction parameters of the thread have been chosen, it is not easy to interconnect threaded elements made according to different standards or according to the same standard but with different construction parameters. In fact, transition modules specifically adapted to the purpose are needed. This makes it difficult to extend, repair and/or convert the above systems. In fact, an operator who has to convert, repair and/or extend such systems is obliged to use threaded elements according to the standard of the system components and to follow the specific construction parameters already present. This limits the freedom to intervene of operators.

A further problem with current connection technologies is that the type of thread has to be predetermined and the system has to be correctly sized a priori. In fact, an operator who wants to use threaded connecting elements is obliged to establish in advance first the type of standard to be used and then the specific construction parameters to be adopted. Once this choice is made, the operator is obliged to continue to use this standard and these construction parameters even if the system requires unforeseeable changes.

SUMMARY OF THE INVENTION

The aim of this invention is therefore to eliminate the above-mentioned disadvantages.

The invention achieves the aim by means of a structural modification allowing the connecting element to be associated with interchangeable components belonging to different standards.

The main advantage obtained by means of this invention is basically the fact that it is possible to have at one's disposal a threaded connecting element that is versatile and compatible both with existing threading standards and with the various construction parameters of the same. Even in production phase it can be advantageous the possibility to concentrate the activity on the realization of a single connecting element that, appropriately equipped with interchangeable components, is suitable for use in various sectors, for example in the mechanical field, agricultural, electrical and hydraulic.

A further advantage is the fact that it is possible to have at one's disposal a threaded connecting element that can be easily used for the expansion, repair and/or conversion of mechanical systems or piping systems.

Another advantage is that the connecting element can be easily reconverted according to the invention, modifying the thread standard used.

In addition, in some embodiments, the connecting element according to the invention can be easily converted from a male type connecting element to a female type connecting element, optionally rotating.

Furthermore, the connecting element according to the invention can be configured by an operator according to his needs, freely choosing the type of standard or protocol to be adopted in each of the housing of the connecting element, through the insertion of appropriate inserts.

BRIEF DESCRIPTION OF THE DRAWINGS

Further advantages and features of the invention will be more apparent in the detailed description which follows, with reference to the accompanying drawings, which show an example, non-limiting embodiment, in which.

Figure 3:
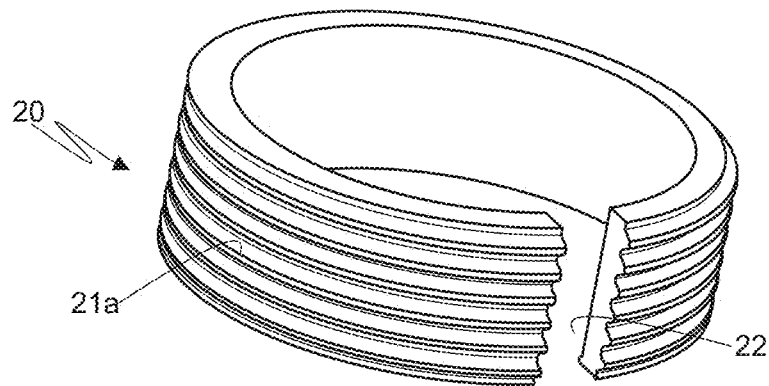
FIG. 3 shows a perspective view of a component of the invention.
Figure 11:
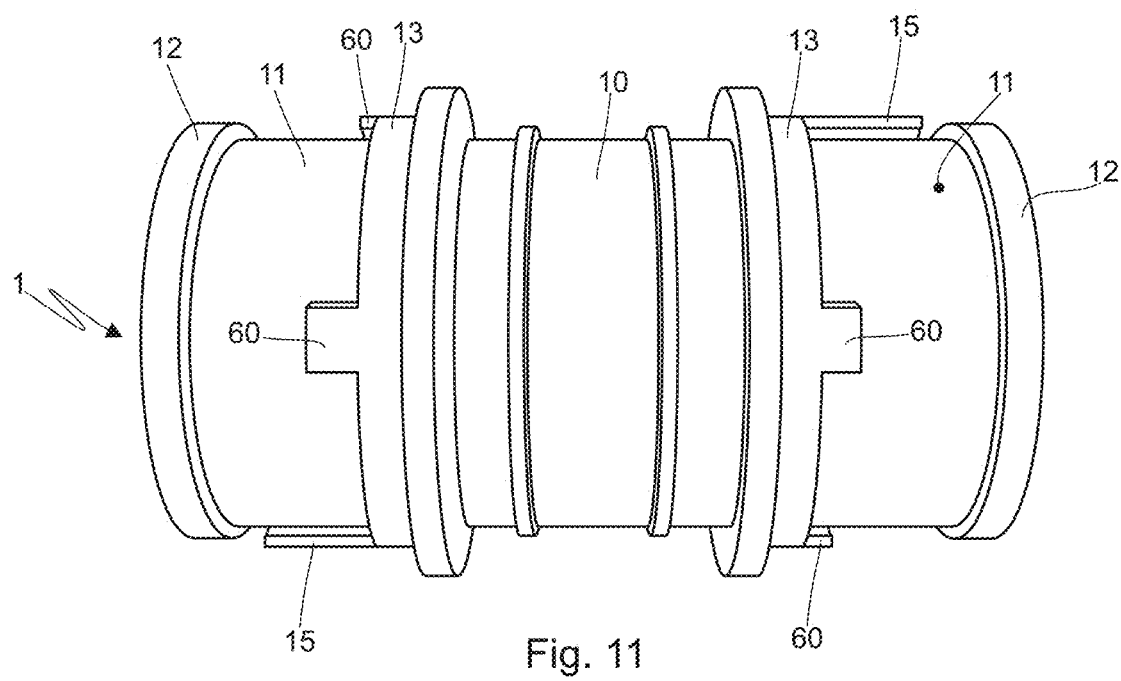
Figure 12:
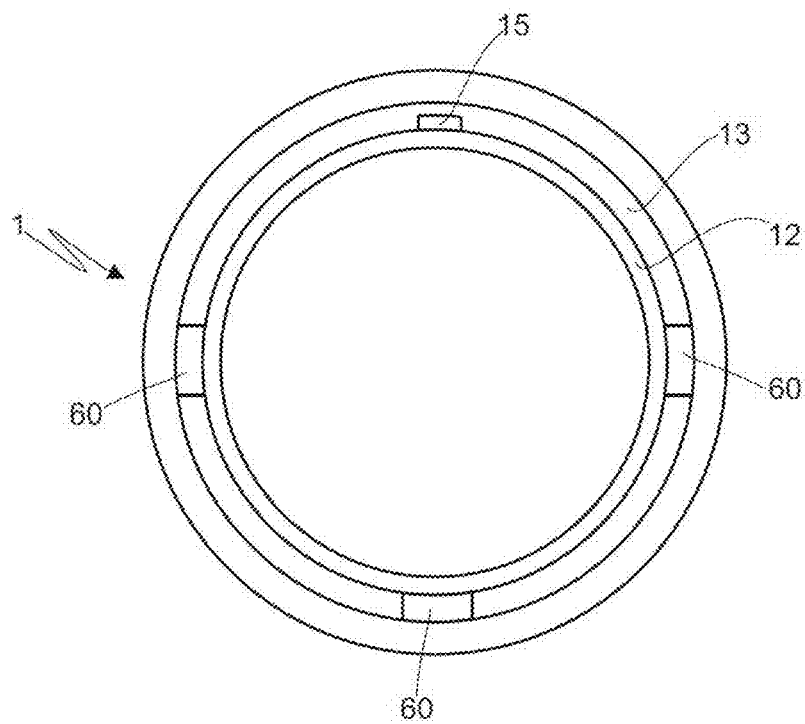
Figure 13:
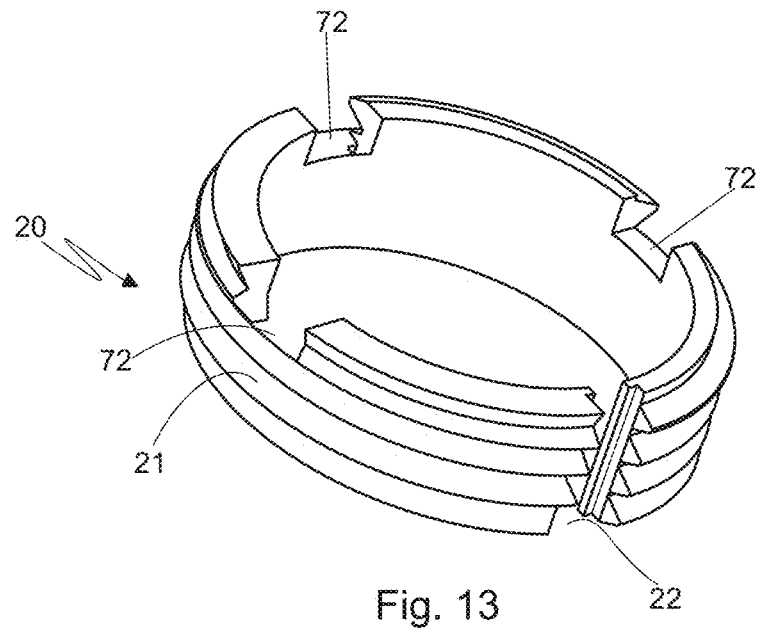
Figure 14:
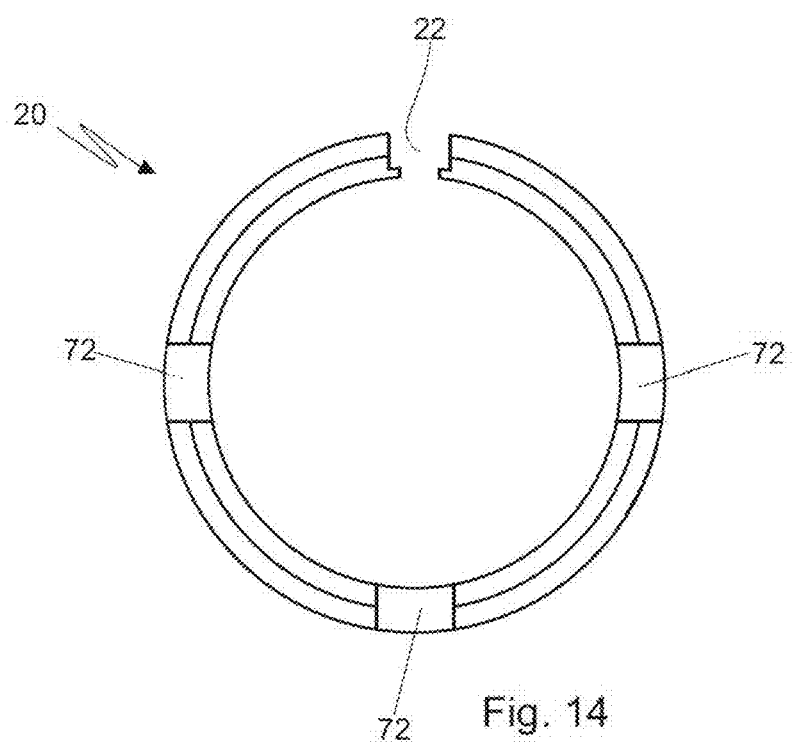
Figure 15:
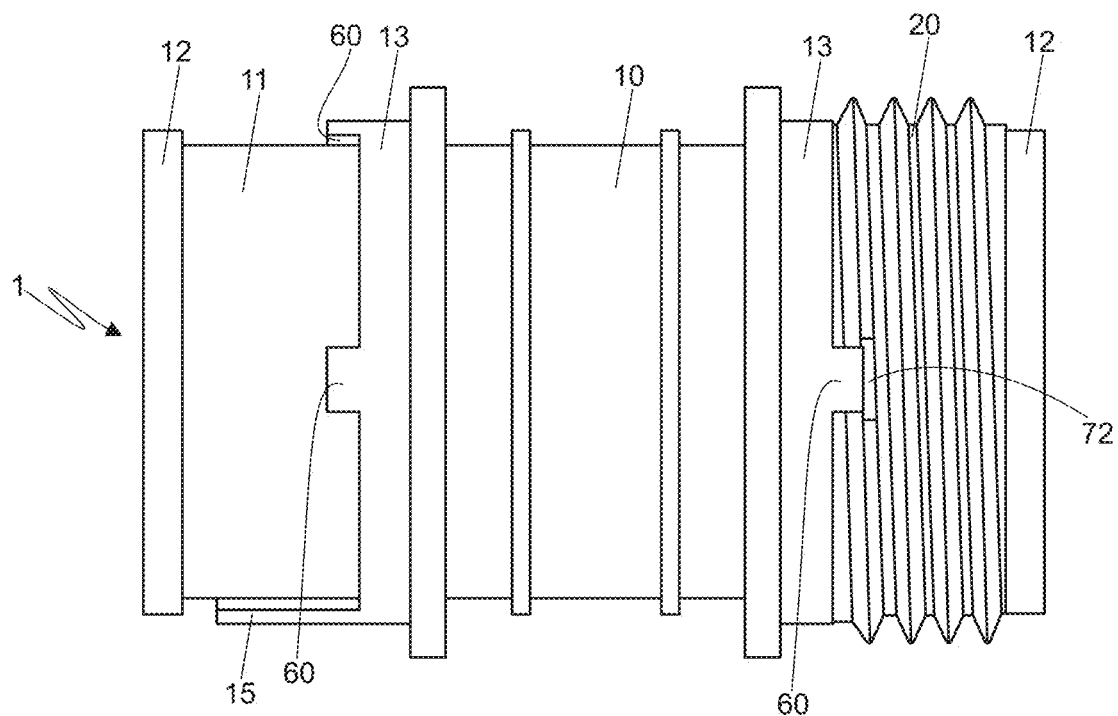
Figure 16:
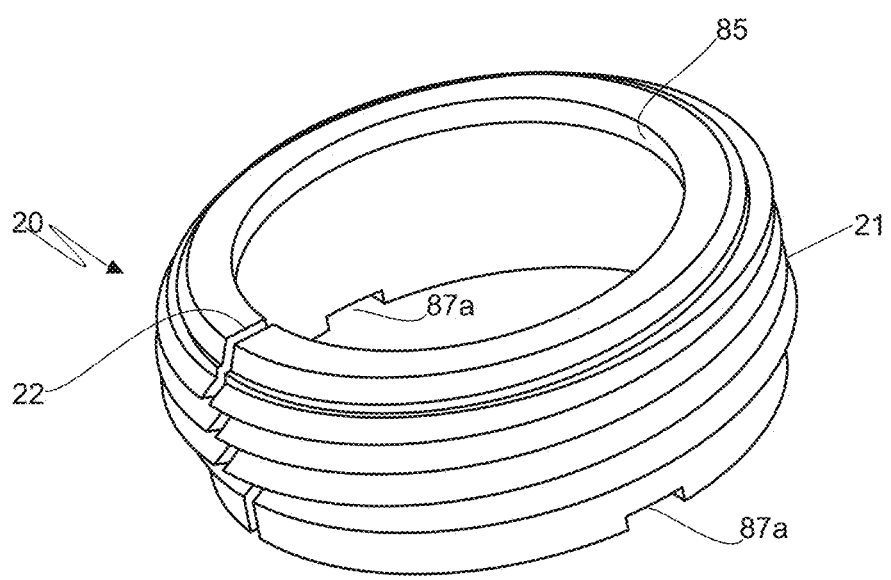
Figure 17:
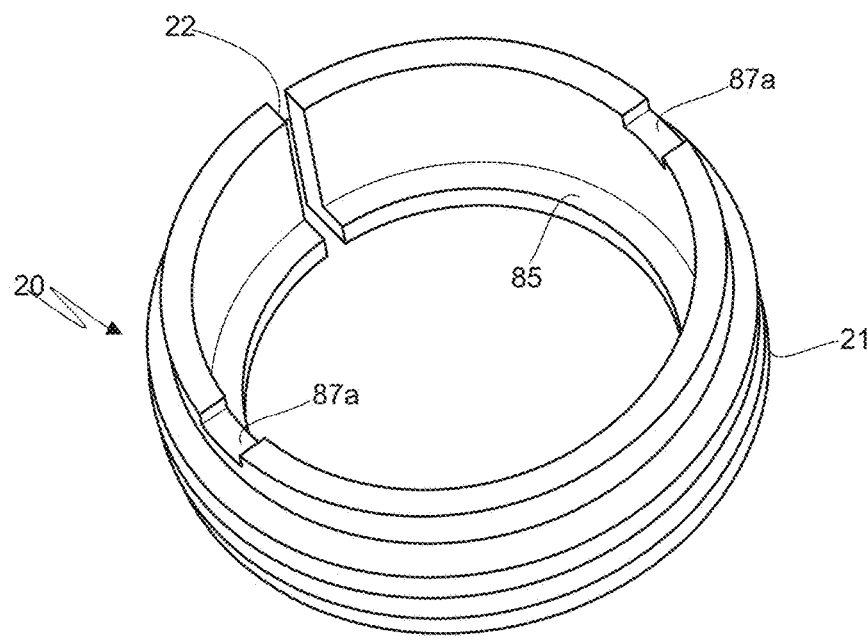
Figure 18:
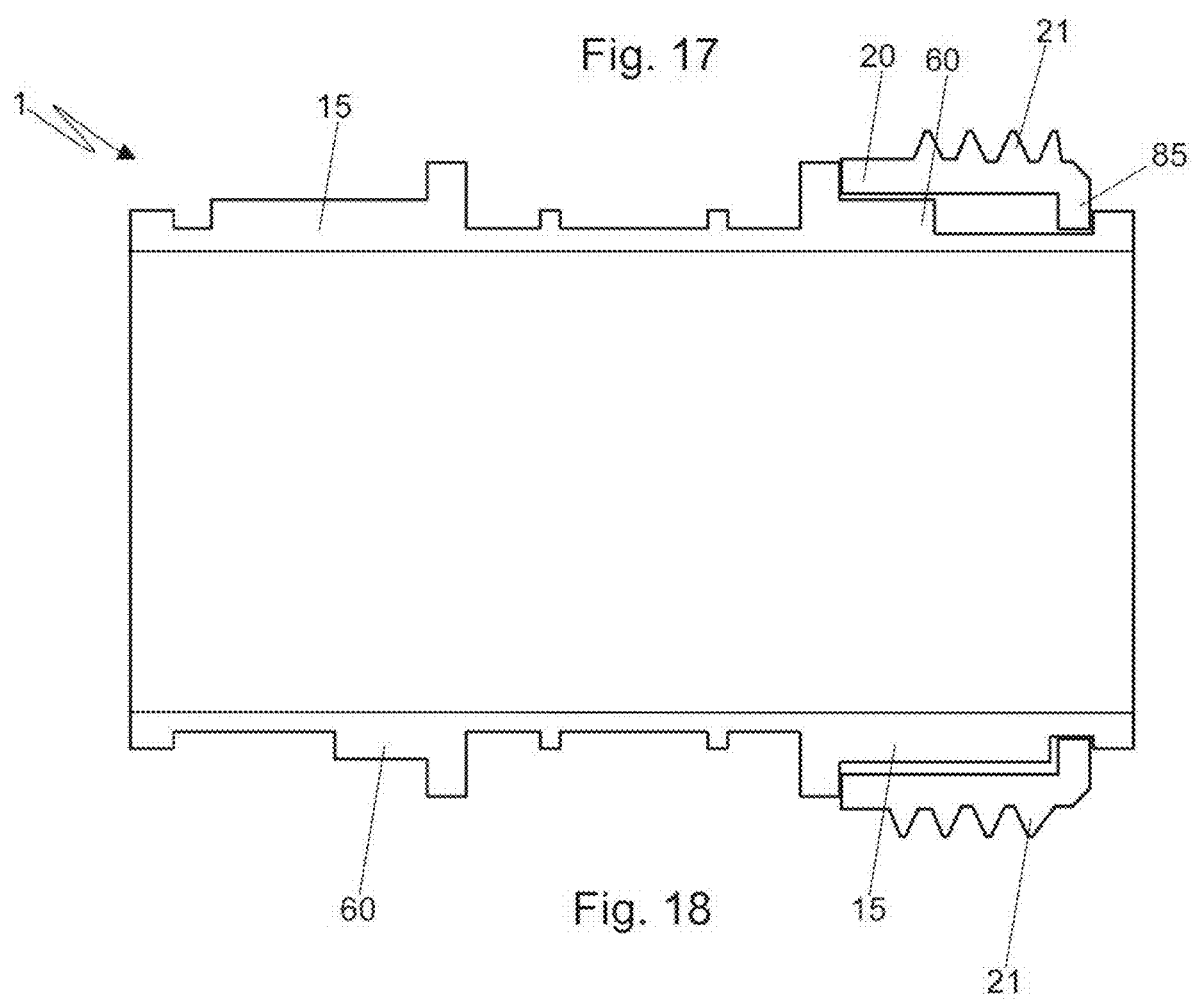
Figure 19:
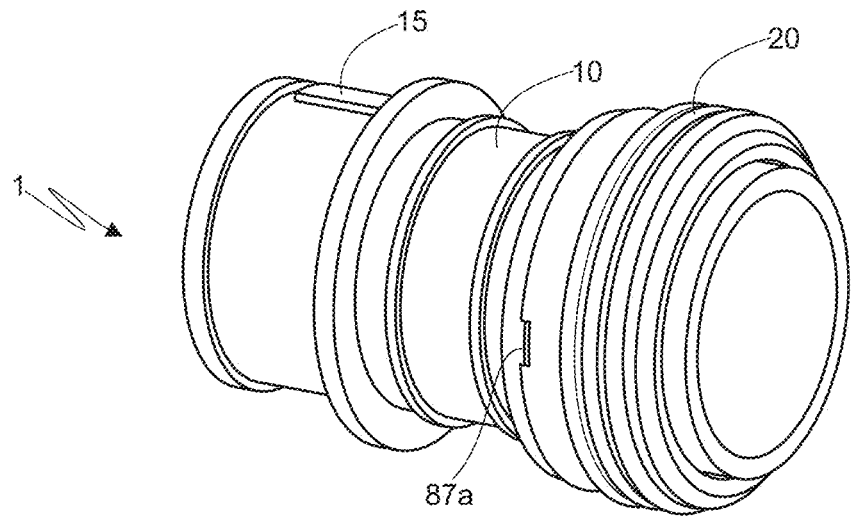
Figure 20:
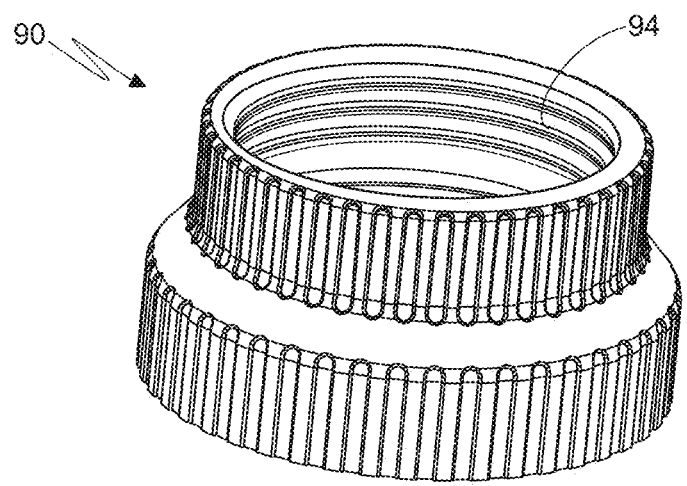
Figure 21:
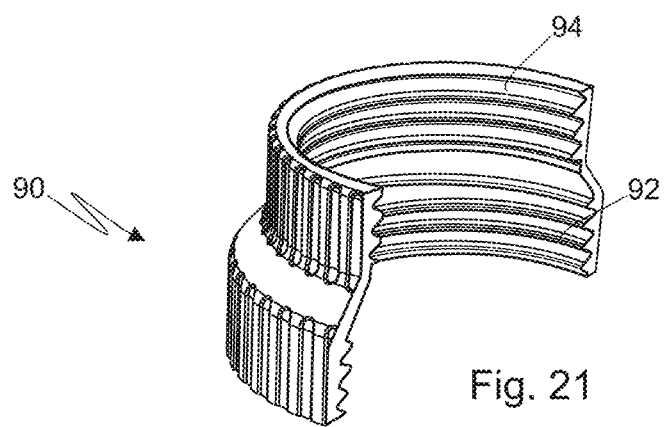
Figure 22:
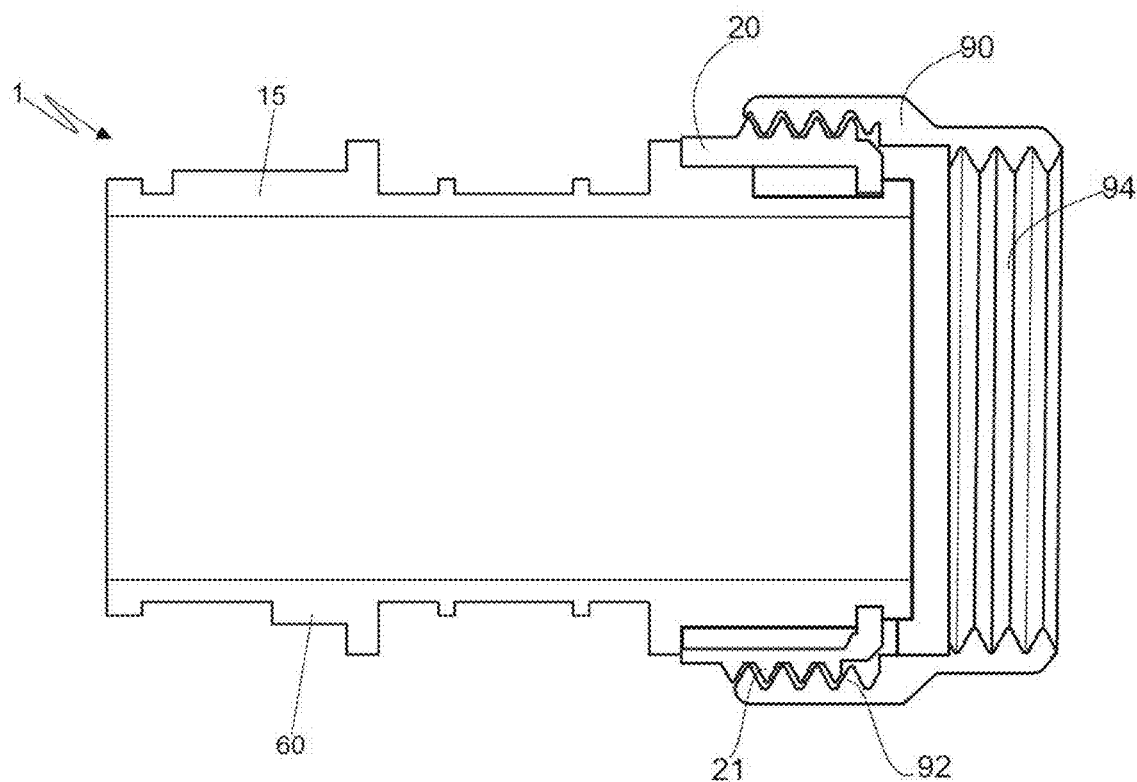
Figure 23:
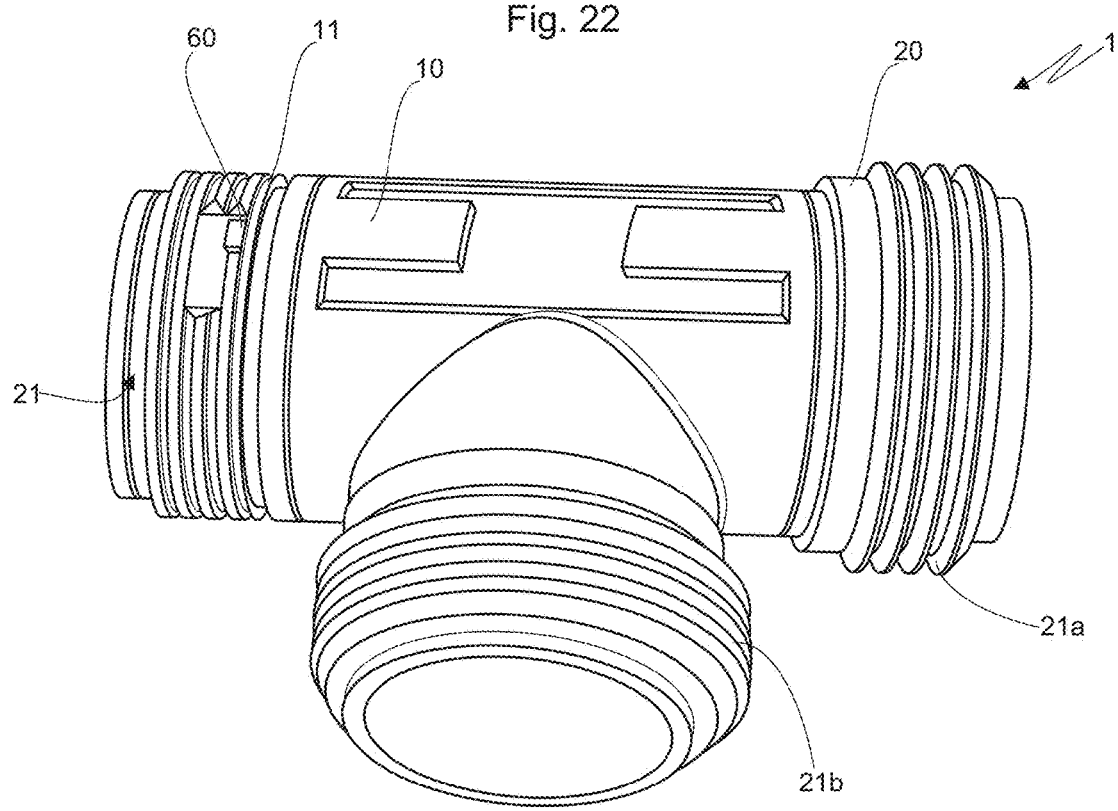

FIGS. from 6 to 10 show a third version of the component of FIG. 3;

FIGS. 11 and 12 respectively show a side view and a top view of a third variant of the invention;

FIGS. 13 and 14 respectively show a perspective bottom view and a bottom view of a fourth version of the component of FIG. 3;

FIG. 15 shows in a side view the variant of FIG. 11 in a use condition;

FIGS. 16 and 17 respectively show a perspective top view and a perspective bottom of a fifth version of the component of FIG. 3;

FIGS. 18 and 19 respectively show a cross-section view and a perspective view of the variant of FIG. 11 in a second use condition;

FIGS. 20 and 21 respectively show a side perspective view and a cross-section perspective view of an additional component of the invention;

FIG. 22 shows a cross-section view of the invention in a third use condition;

FIG. 23 shows a perspective view of a further variant of the invention.

DESCRIPTION OF THE PREFERRED EMBODIMENTS

Figure 1:
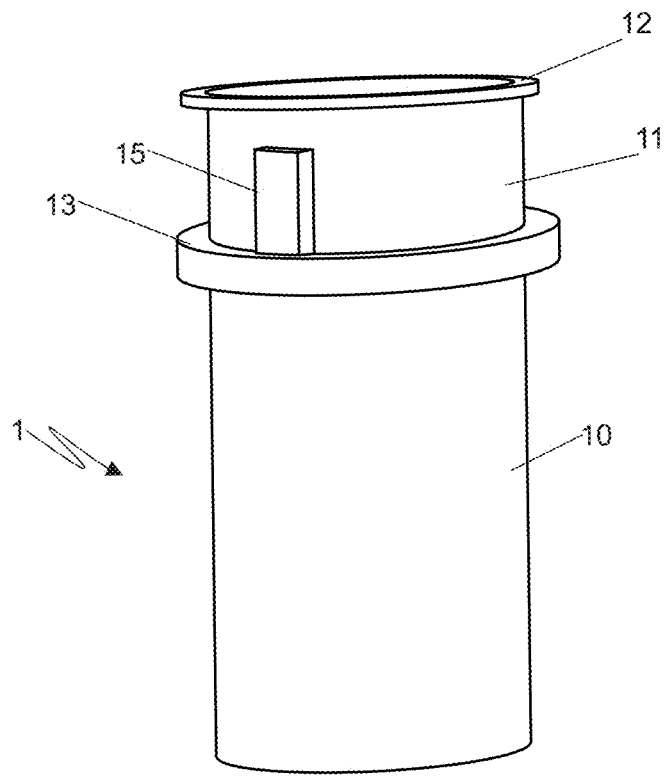
FIG. 1 shows a frontal perspective view of a basic version of the invention.

Referring to FIG. 1, it is possible to observe a connecting element 1 according to the invention comprising a main body 10 wherein a housing 11 is made. This housing 11 is preferably located at a first end of the main body 10. The housing 11 is delimited by a top edge 12 and by a bottom edge 13, both protruding from a side surface of main body 10. In other words, the top edge 12 and bottom edge 13 extend outwards with respect to the side surface of the main body 10.

Alternatively, the connecting element according to the invention may comprise a hollow housing in the main body. In particular, this housing can be obtained by narrowing the thickness of the side surface of the main body of the connecting element. In this case, the bottom edge and the top edge are made by the side surface itself of the main body.

The housing 11 also includes at least one main protrusion 15, made along a direction connecting the top edge 12 and the bottom edge 13 of the housing 11. This main protrusion 15 also protrudes from the side surface of the main body 10 and it may affect the entire housing 11 or only part of it.

The housing 11 is configured to receive at least one annular insert 20.

FIG. 3 shows the annular insert 20 comprising constraint means 21 and a slit 22 extending from a top of the insert 20 to a bottom of such insert 20.

The constraint means 21 of the insert 20 preferably consist of an external thread 21a, or of male type.

Insert 20 is configured to be inserted into housing 11 of the connecting element 1. The structural realization of insert 20 with dimensions complementary to housing 11 prevents the longitudinal translational movement of the insert 20 itself, when it is placed in the housing 11. The engagement of slit 22 with the main protrusion 15 of housing 11 prevents the rotary movement of insert 20. Preferably, the insert 20 is housed in the housing 11 of the connecting element 1 through, for example, elastic deformation or combination of parts that can be stably associated with each other.

Figure 2:
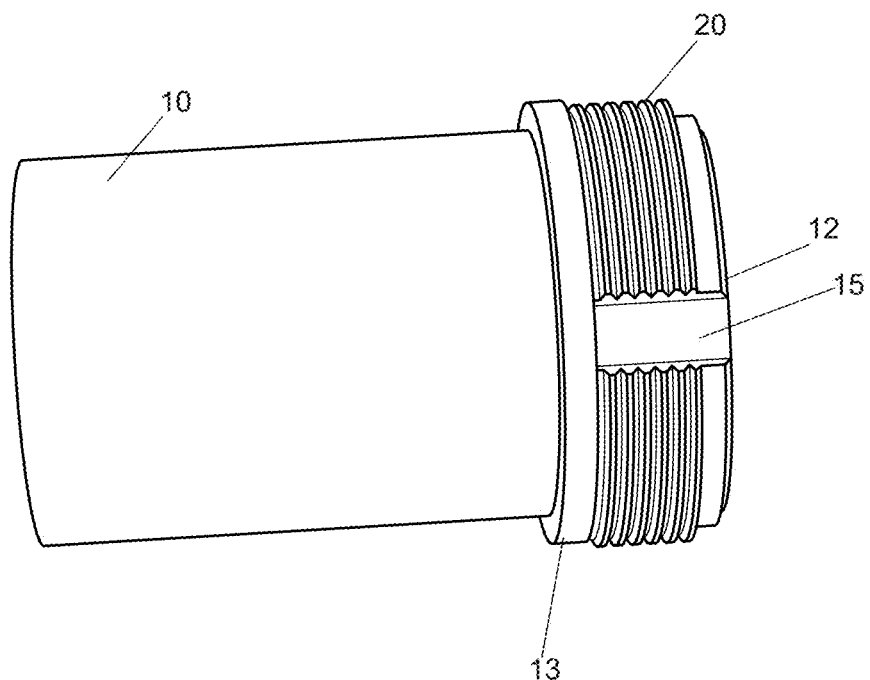
FIG. 2 shows a frontal perspective view of a first alternative of the invention.

FIG. 2 shows a connecting element 1 with the insert 20 inserted into the housing 11. As mentioned above, the connecting element 1 composed in this way ensures structural continuity between main body 10 and the insert 20.

Figure 4:
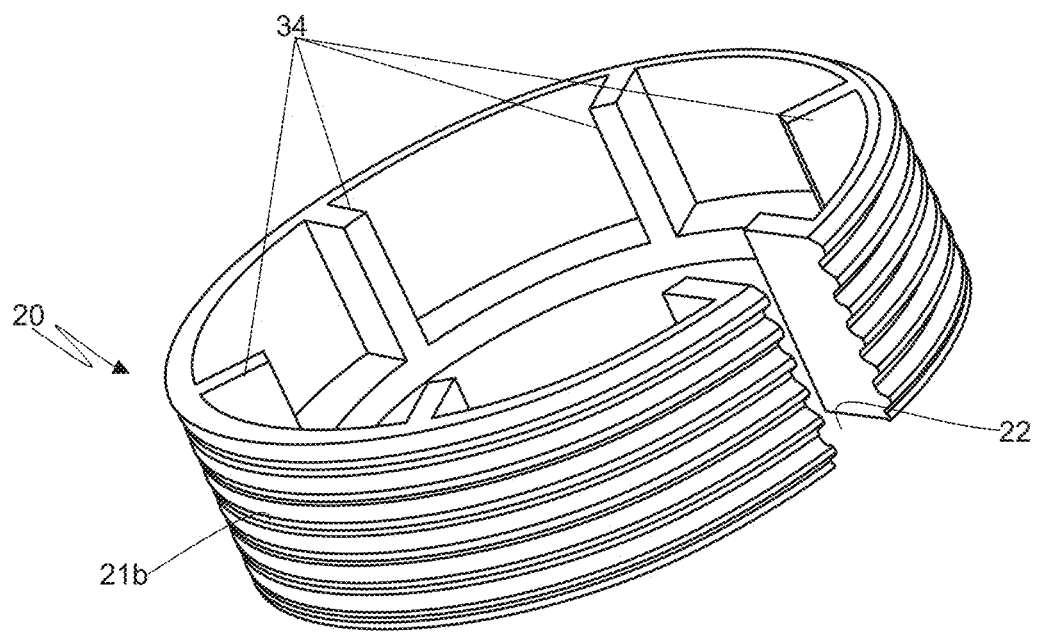
FIG. 4 shows a perspective view of a second version of the component of FIG. 3.

FIG. 4 shows the annular insert 20 comprising constraint means 21 consisting of an external thread 21b, optionally different with respect to the one described above.

Sometimes, the connecting element according to the invention may include inserts similar to the one described above, except for the type of constraint means installed, that can be for example interlocking or hinged, or also consist of external threads of any type, protocol, standard or size.

Sometimes, the connecting element according to the invention may include inserts similar to the one described above, except for the type of constraint means installed, that can be for example interlocking or hinged, or also consist of external threads of any type, protocol, standard or size.

Preferably insert 20 also includes a plurality of longitudinal elements 34, protruding from an internal surface, opposite to the threaded one, and extending along a direction connecting the top and bottom of such insert 20. These longitudinal elements 34 are configured to confer greater structural stability to the insert 20, when it is housed in housing 11 of the connecting element 1.

Preferably, insert 20 is made in a single piece.

In some case the connecting element 1 according to the invention can comprise inserts 20 made up of several pieces, which can be connected together by constraint means, such as interlocking systems or hinges.

FIGS. 6 to 10 show an insert 20 which can be assembled by the union of two distinct elements: a first element 50a and a second element 50b. The first element 50a is shown in front view in FIG. 6 and in perspective view in FIG. 7; it comprises constraint means 21, preferably consisting of an external or male type thread, and association means 51, preferably consisting of a male type interlocking system 51a, configured to interoperate with the second element 50b. The latter, shown in front view in FIG. 8 and in perspective view in FIG. 9, comprises constraint means 21 of the same type, standard or protocol of the constraint means 21 of the first element 50a, consisting preferably of an external or male type thread, and association means 51, preferably consisting of a female type interlocking system 51b, intended to the connection with the first element 50a.

Preferably, the first element 50a and the second element 50b have the shape of a semi-circumference.

Figure 10:
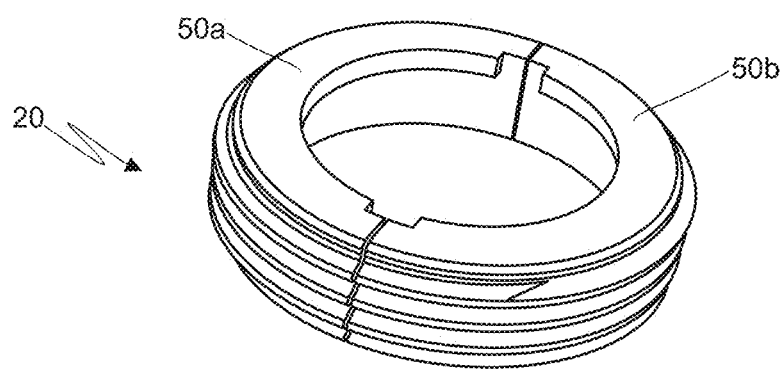

FIG. 10 shows the insert 20 when the first element 50a and the second element 50b are connected together by association means 51.

The insert 20 is configured to be inserted in correspondence of a housing 11 of the connection element 1 by interlocking.

In other cases, the connecting element 1 according to the invention can comprise inserts 20 that may be composed through the union of more than two elements.

Figure 5:
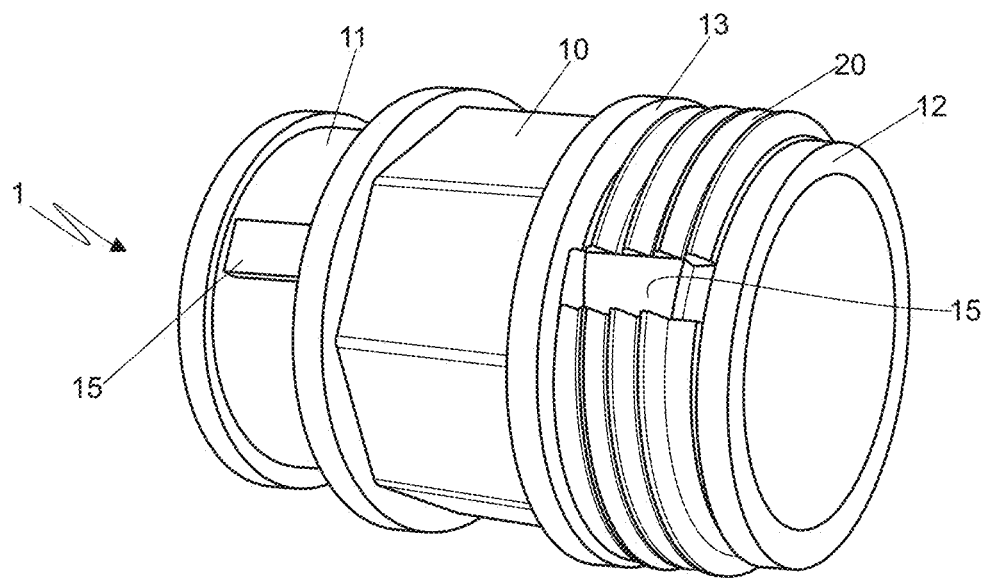
FIG. 5 shows a perspective view of a second alternative of the invention.
Figure 6:
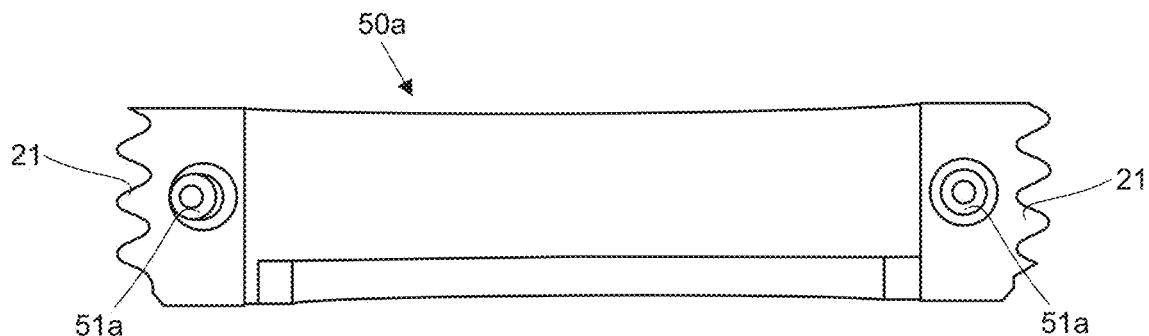
Figure 7:
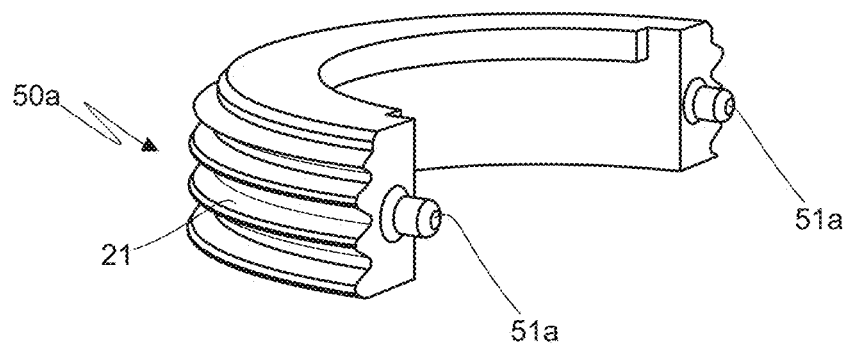
Figure 8:
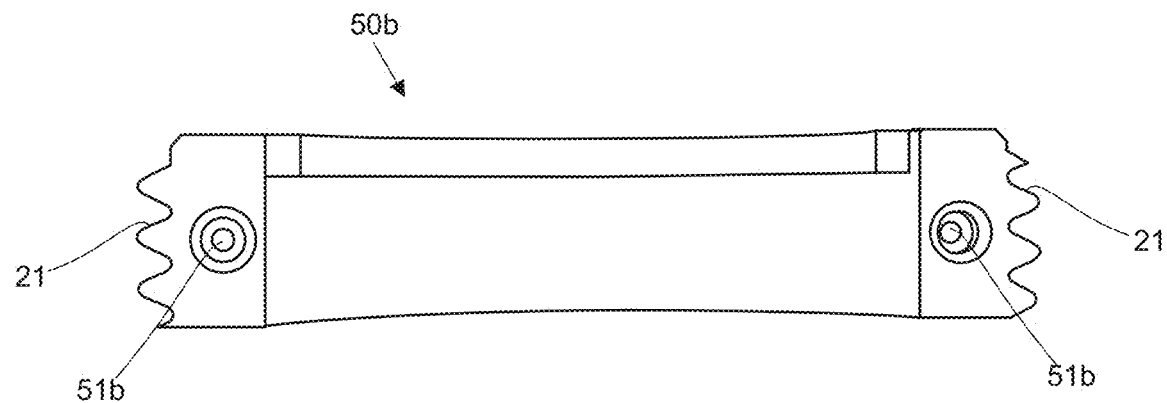
Figure 9:
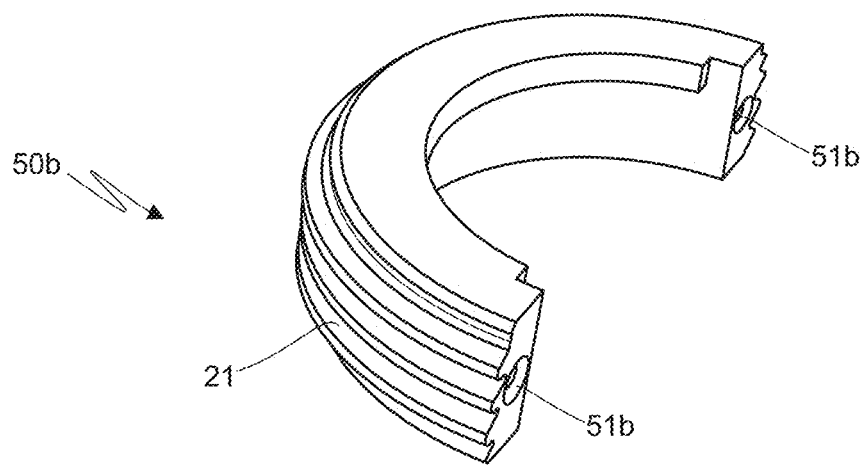

FIG. 5 shows an embodiment of the connecting element 1 comprising a second housing 11 totally analogous to the one described above, preferably positioned at a second end of the main body 10.

Optionally, the main body 10 has at its center a side surface having an anti-slip conformation.

As a consequence, the connecting element 1 is configured to receive at least two inserts 20. For example, FIG. 5 shows the connecting element 1 with insert 20 inserted in housing 11.

In some cases, at least one of the housings 11 of the connecting element 1 may comprise at least one additional protrusion 60, as shown in FIGS. 11 and 12.

The additional protrusion 60 is an interrupted protrusion, i.e. it is connected only to one between the top edge 12 and the bottom edge 13 of the housing 11. In other words, the additional protrusion 60 protrudes from the main body 10 and has a longitudinal extension lower than the distance between the top edge 12 and the bottom edge 13 of the housing 11.

Preferably the additional protrusion 60 protrudes from the side surface of the main body 10 and is realized along a direction connecting respectively the top edge 12 and the bottom edge 13 of at least one of the housings 11. Optionally, this direction is orthogonal to the top edge 12 and bottom edge 13.

For example, in FIGS. 11 and 12 each of the housings 11 comprise respectively a main protrusion 15 and three additional protrusions 60.

The main protrusion 15 and the three additional feedback 60 can be distributed in an equidistant way, meaning that they can be angularly spaced at the same distance.

In general, the connecting element 1 may comprise a main body 10 provided with an arbitrary number of housings, such as illustrated in FIG. 23, and each housing may comprise a different number of additional protrusions 60, also positioned differently with respect to what was described above.

In the event that a connecting element 1, comprising one or more additional protrusions 60, has to be associated with an annular insert 20, the latter shall be provided with one or more windows 72 made in correspondence of the additional protrusions 60.

The windows 72 are made by means of interruption on the side wall of insert 20: unlike slit 22, windows 72 are small in size, enough to accommodate the additional protrusions 60.

As an example, an insert 20 with three windows 72 is represented in a perspective bottom view in FIG. 13 and in a bottom view in FIG. 14.

The slit 22 and the windows 72 can be distributed in an equidistant way, or they can be angularly spaced of the same distance.

FIG. 15 shows connecting element 1 with insert 20, comprising three windows 72, inserted in housing 11. The engagement of the three additional protrusions 60 with the three windows 72 helps to prevent the rotary movement of insert 20 when inserted into housing 11, which ensures the structural stability of the connecting element 1.

The connecting element 1 may include a main protrusion 15 made in the same way as an additional protrusion 60, i.e. may comprise a main protrusion 15 interrupted nearby the top edge of the housing and/or nearby the bottom edge, without this affecting the stability of the connecting element itself when receiving one or more inserts 20. As an example, all the main protrusions 15 represented in the attached figures are interrupted.

The use of interrupted main protrusions 15 on the main body 10 is well suited to the possibility of using the connecting element 1 even with the characteristics of a female type junction. In this perspective, the annular insert 20, represented in perspective top view in FIG. 16 and in perspective bottom view in FIG. 17, can be provided with a circumferential relief 85, preferably placed nearby its top portion, protruding radially towards the center of the ring. This circumferential relief 85 is interrupted by the slit 22; its radial extension corresponds at least to the radial extension of the protrusions 15; 60. In fact, this circumferential relief 85 is configured to interoperate with the portion of the housing 11 corresponding to the interruption of the main protrusion 15.

The annular insert 20 also further comprises blocking means 87, preferably consisting of at least one opening 87*a*, made by a partial and limited interruption of the bottom of insert 20. Therefore, the top of insert 20 is not interrupted in correspondence of opening 87*a*.

In FIGS. 16 and 17, an insert 20 comprising two openings 87*a* is shown as an example.

An embodiment of the connecting element 1 described above is represented in cross-section in FIG. 18 and in perspective view in FIG. 19. In this case, thanks to its structural conformation and to the presence of the circumferential relief 85, the insert 20 acts as an idle ring when inserted in housing 11, being able to freely rotate with respect to the main body 10.

Even if the circumferential relief was made nearby to the bottom of insert 20, the same functionality would be maintained as long as blocking means 87 remained nearby to that bottom edge.

To assume the functionality of a female connection, the connecting element 1 may include a ferrule 90, represented in FIGS. 20 and 21 respectively according to a perspective view and a section perspective view.

The ferrule 90 comprises first constraint means 92 and second constraint means 94. The first constraint means 92 shall be complementary to the constraint means 21 means of insert 20. Preferably, they consist of an internal or female type thread. The second constraint means 94 consist of an internal or female type thread.

FIG. 22 shows a cross-section view of the connecting element 1 thus obtained, wherein the system consisting of insert 20 and ferrule 90 behaves once again as a single idle rotating body. By way of example, the insert 20 can be inserted into the housing 11 of the connecting element 1 by means of elastic deformation, after which ferrule 90 can be constrained to this insert 20 by screwing. More in detail, an operator must lock the insert 20 in order to constraint the ferrule 90 to it by screwing. This ensures the continuity and structural stability of the connecting element 1.

The blocking means 87, consisting of the opening 87*a* of insert 20, have the function of facilitating the operator in locking insert 20 during the locking and release phases of ferrule 90, possibly by means of appropriate tools configured to be inserted in the opening 87*a*, such as a screwdriver.

Alternatively, blocking means 87 could include at least one protrusion to block the insert 20 during the locking and release phases of ferrule 90, possibly by means of appropriate tools.

Therefore, the connecting element provided comprising universal constraining means according to the invention allows the interconnection of threaded connecting elements and the construction of systems comprising threaded joining elements in a versatile, reliable, efficient, easy, economical and reversible way. In particular, it allows an operator not to predetermine the type of thread and not to size the system a priori. Moreover, thanks to the simple but effective replacement of inserts, it allows the conversion, repair and/or expansion of mechanical systems or piping systems in many sectors, such as mechanical, agricultural, electrical or hydraulic.

It should be noted that the structural seal of the inserts is ensured, while any hydraulic seal must be ensured by the use of suitable seals, for example flat or toroidal, optionally elastic deformable.

It is also emphasized that the connecting element according to the invention can easily be converted from a male connecting element to a female connecting element.

It should be noted how each end of the connecting element according to the invention, in its respective cylindrical hollow, can receive an additional appendix, such as a hose holder or a cable gland.

What is claimed is:

1. A connecting element comprising: comprising
a main body including at least one housing, delimited by
a top edge and by a bottom edge, comprising at least one main protrusion made along a direction connecting the top edge and the bottom edge of the at least one housing, at least one annular insert housed in the at least one housing, said at least one annular insert comprising an outer constraint device and at least one window, made on a sidewall thereof, wherein the at least one housing comprises at least one interrupted additional protrusion complementary to the at least one window, only connected to the top edge or to the bottom edge of the at least one housing.

2. The connecting element according to claim 1, wherein the outer constraint device consists of an outer thread.

3. The connecting element according to claim 1, wherein the at least one annular insert comprises a slit.

4. The connecting element according to claim 1, wherein the at least one annular insert comprises at least two elements including mutually complementary association means.

5. The connecting element according to claim 1, wherein the at least one main protrusion is an interrupted protrusion, only connected to the top edge or to the bottom edge of the at least one housing.

6. The connecting element according to claim 5, wherein the at least one annular insert comprises a circumferential relief, radially protruding towards a center of the at least one annular insert with a radial extension that is at least equal to the at least one main protrusion and a blocking surface, made nearby a bottom of the at least one annular insert.

7. The connecting element according to claim 6, wherein the blocking surface of the at least one annular insert consists of at least one opening, made by an interruption of the bottom of the at least one annular insert.

8. The connecting element according to claim 6, comprising a ferrule provided with a first constraint device and a second constraint device, wherein the first constraint device is complementary to the outer constraint device of the at least one annular insert and the second constraint device consists of an inner thread.

9. A connecting element mounting kit comprising:
the connecting element according to claim 1.

10. A connecting element comprising:
a main body including at least one housing, delimited by a top edge and by a bottom edge, comprising at least one main protrusion made along a direction connecting the top edge and the bottom edge of the at least one housing, the at least one main protrusion being an interrupted protrusion, only connected to the top edge or to the bottom edge of the at least one housing, at least one annular insert housed in the housing, said at least one annular insert comprising an outer constraint device, and a circumferential relief, radially protruding towards the center of the at least one annular insert with a radial extension that is at least equal to the at least one main protrusion, and a blocking surface, made nearby a bottom of the at least one annular insert.

11. The connecting element according to claim 10, wherein the blocking surface of the at least one annular insert consists of at least one opening, made by an interruption of the bottom of the at least one annular insert.

12. The connecting element according to claim 10, comprising a ferrule provided with a first constraint device and a second constraint device, wherein the first constraint device is complementary to the outer constraint device of the at least one annular insert and the second constraint device consists of an inner thread.

13. A connecting element mounting kit comprising:
the connecting element according to claim 10.

* * * * *